No. 838,415. PATENTED DEC. 11, 1906.
J. H. JACKSON.
ARTIFICIAL TOOTH.
APPLICATION FILED OCT. 26, 1905.

WITNESSES
A. T. Palmer
E. F. Uniac

INVENTOR
John H. Jackson
By Francis J. V. Dakin
his Atty

UNITED STATES PATENT OFFICE.

JOHN H. JACKSON, OF BOSTON, MASSACHUSETTS.

ARTIFICIAL TOOTH.

No. 838,415.     Specification of Letters Patent.     Patented Dec. 11, 1906.

Application filed October 26, 1905. Serial No. 284,412.

*To all whom it may concern:*

Be it known that I, JOHN H. JACKSON, a citizen of the United States, residing at Boston, county of Suffolk, State of Massachusetts, have invented a new and useful Improvement in Artificial Teeth, of which the following is a full, clear, and exact specification, reference being made therein to the accompanying drawings.

My invention relates to artificial teeth; and it consists in providing novel means for securing the teeth to the rubber plate or support.

Heretofore artificial teeth have been secured to the rubber plate or support by means of pins set transversely in the teeth and projecting therefrom. Where high-fusing porcelain is used, such pins are made of platinum or platina, that being the only metal that is not fused in the baking process. The principal objection to this method is that platina is very expensive, and pins so made add greatly to the cost of the teeth. Furthermore, platina, being more or less ductile, does not form as strong a pin as one made of a baser metal.

Various attempts have been made to reduce the cost of artificial teeth either by reducing the amount of platina used in the pins or by doing away with it entirely. Pins have been made entirely of baser metals; but such pins cannot be used with high-fusing porcelain, and when used with low-fusing porcelain the baking process burns the pins and weakens them. Furthermore, pins so made corrode and do not adhere to the rubber plate or backing. In other cases a lesser amount of platina has been used. For example, a thin collar or short tube of platina has been baked in the tooth and then a pin of baser metal secured within the collar or tube by soldering. The collar or tube must be of sufficient thickness to hold the pin which is soldered to it, and although it requires less platina than a solid platina pin, yet it still requires too much of that metal from the viewpoint of expense. After the tooth is completed it is customary to test the pins in order to ascertain whether or not they are firmly fastened within the tooth.

The object of my invention is to provide cheaper, stronger, and more efficient means for securing artificial teeth to the rubber plate or backing, and I accomplish these results by providing a pin anchored in the tooth and composed of a thin shell of platina filled in with a fused metal.

Figure 1:
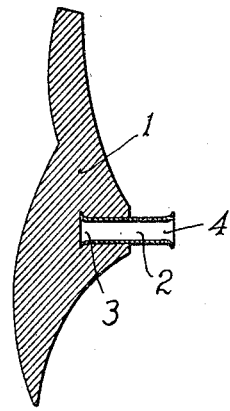
Figure 2:
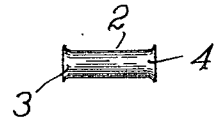
Figure 3:
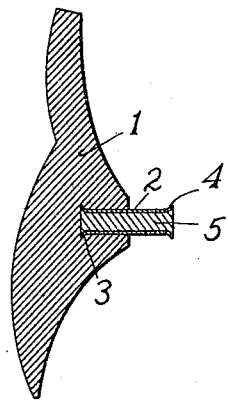
Figure 4:
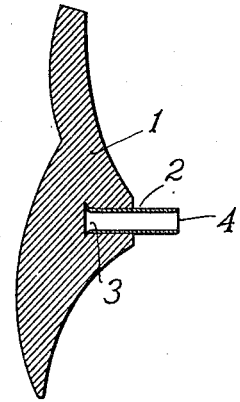

In the accompanying drawings, in which like numbers refer to like parts throughout the several views, Figure 1 is a vertical sectional view of an artificial tooth with my shell set therein. Fig. 2 is a side elevation of the shell. Fig. 3 is a vertical sectional view of tooth and the shell filled with fused metal, and Fig. 4 is a vertical sectional view of tooth and a modified form of shell.

Referring to the drawings, 1 represents the tooth, which is shown in vertical section, and 2 is a thin cylindrical shell of platina, having flared ends 3 and 4, 3 being the inner end embedded and anchored in the tooth. This shell 2 is placed in the porcelain when it is in a plastic condition and is baked in the tooth. The inner flared end 3 forms an anchor to prevent the shell being withdrawn from the tooth after it has been hardened by the baking process. After the tooth has been baked I place a piece of wire of suitable size and composed of a metal or alloy having a fusing-point lower than that of the platina or the porcelain within the shell 2 and then subject the tooth to a heat just sufficient to free the wire without affecting the shell 2 or the tooth 1. The wire should be of such size that after being fused the shell 2 is completely filled up with the fused metal 5, as shown in Fig. 3. It will be noticed that the fused metal 5 spreads into the flared end 3 of the shell and when cooled the shell is filled with solid metal having a flared inner end, which acts as an anchor to prevent the pin being withdrawn or pulled out. The strength of the pin as thus constructed depends upon the kind of fusible metal used, and pins of varying degrees of strength may be made by employing different metals. As thus constructed my pin is entirely solid and requires no testing, its strength being dependent solely upon the kind of fusible metal of which it is mainly composed.

I avoid the expense and delay of any testing process, since my pin can be detached from the tooth only by fracturing or breaking it. Generally the pin will last longer than the tooth.

The shell 2 is of a thickness just sufficient to prevent it bending or breaking when placed in the plastic porcelain before baking, and therefore requires a minimum amount of platina, and thereby greatly reduces the cost of the tooth. The fusing operation is very simple and requires no skilled labor, also further and materially reducing the cost.

I extend the shell 2 beyond the surface of the tooth in order that the pin when completed shall present a platina surface to the rubber plate or backing in which the tooth is set. This is desirable for several reasons. In the first place, a platina surface forms a better adhesion with the rubber than does a base metal. Secondly, a base metal is apt to corrode from the sulfur in the rubber or from other reasons, which weakens the pin and loosens the tooth on the plate.

In Figs. 1, 2, and 3 the shell 2 is shown with its outer end 4 flared and filled with the center body of fused metal. This construction has the advantage of providing a means for better securing the tooth to the rubber plate, the pin being anchored at both ends and in the plate as well as in the tooth.

Fig. 4 illustrates a pin without an outer flare which may be used in ordinary cases; but in most cases I prefer the form shown in the other figures.

In my invention the platina shell serves merely as a receptacle to receive and shape the fused metal and at the same time to present a platina surface to the rubber support or backing. All the strain of later use comes upon the fused metal of which the pin is formed.

What I claim is—

In an artificial tooth, a pin consisting of a shell of platina filled with metal having a lower fusing-point than that of the porcelain; the metal being fused within said shell after the tooth has been baked.

In testimony whereof I have hereunto set my hand, in the presence of two subscribing witnesses, this the 14th day of October, 1905.

JOHN H. JACKSON.

Witnesses:
 LOUIS L. CARDINAL,
 E. F. NUIAC.